US008824292B2

(12) United States Patent
Matsuo

(10) Patent No.: US 8,824,292 B2
(45) Date of Patent: Sep. 2, 2014

(54) CROSS-CONNECT METHOD AND CROSS-CONNECT APPARATUS

(75) Inventor: Hiroyuki Matsuo, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 1071 days.

(21) Appl. No.: 12/574,347

(22) Filed: Oct. 6, 2009

(65) Prior Publication Data

US 2010/0092173 A1 Apr. 15, 2010

(30) Foreign Application Priority Data

Oct. 15, 2008 (JP) ................................. 2008-266377

(51) Int. Cl.
| | | |
|---|---|---|
| *G01R 31/08* | (2006.01) | |
| *G06F 11/00* | (2006.01) | |
| *G08C 15/00* | (2006.01) | |
| *H04J 1/16* | (2006.01) | |
| *H04J 3/14* | (2006.01) | |
| *H04L 1/00* | (2006.01) | |
| *H04L 12/26* | (2006.01) | |
| *H04J 3/16* | (2006.01) | |

(52) U.S. Cl.
CPC .................................. *H04J 3/1611* (2013.01)
USPC ........... 370/235; 370/232; 370/351; 370/386; 398/8; 398/50

(58) Field of Classification Search
CPC ...................................................... H04J 3/1611
See application file for complete search history.

(56) References Cited

U.S. PATENT DOCUMENTS

| 6,618,518 B1* | 9/2003 | Mahadevan et al. ............. 385/18 |
| 6,909,692 B1* | 6/2005 | Sharma et al. ................. 370/232 |
| 8,315,518 B1* | 11/2012 | Yao et al. ......................... 398/45 |
| 2004/0062228 A1* | 4/2004 | Wu ................................. 370/351 |
| 2004/0076166 A1* | 4/2004 | Patenaude ...................... 370/401 |
| 2006/0017494 A1* | 1/2006 | Horiguchi et al. ............. 327/538 |
| 2006/0133366 A1* | 6/2006 | Ho et al. ........................ 370/389 |
| 2006/0210266 A1* | 9/2006 | Aoki ............................... 398/19 |

FOREIGN PATENT DOCUMENTS

| JP | 8-223241 | 8/1996 |
| JP | 9-284307 | 10/1997 |
| JP | 10-257580 | 9/1998 |

OTHER PUBLICATIONS

Japanese Office Action issued mailed Dec. 4, 2012, issued in corresponding Japanese Patent Application No. 2008-266377.

* cited by examiner

*Primary Examiner* — Jae Y Lee
(74) *Attorney, Agent, or Firm* — Staas & Halsey LLP

(57) ABSTRACT

A cross-connect apparatus and method where the apparatus includes an interface section which divides signals from a transmission line into multiple paths to provide the signals to cross-connect sections, and multiplexes signals provided from the cross-connect sections to send out the signals to the transmission line, the cross-connect sections cross-connects the signals from the interface section to output the signals to the interface section. The cross-connect apparatus includes a control section which determines a number of paths divided by the interface section and an operation mode of the cross-connect sections, according to a line capacity occupied by the signals from the transmission line and which controls the interface section and stops an operation of a cross-connect section which does not perform cross-connect processing.

12 Claims, 15 Drawing Sheets

CROSS-CONNECT METHOD AND CROSS-CONNECT APPARATUS

CROSS-REFERENCE TO RELATED APPLICATIONS

This application is based upon and claims the benefit of priority of the prior Japanese Patent Application No. 2008-266377, filed on Oct. 15, 2008, the entire contents of which are incorporated herein by reference.

BACKGROUND

1. Field

The embodiments discussed herein are related to a cross-connect method and a cross-connect apparatus for performing cross-connect processing by multiple cross-connect sections.

2. Description of the Related Art

In a SONET (Synchronous Optical Network) or an SDH (Synchronous Digital Hierarchy), it is common to make a ring network configuration using, for example, a UPSR (Unidirectional Path Switched Ring).

FIG. 1 illustrates a configuration diagram of an example of a SONET ring network. In the figure, transmission apparatuses 1a to 1e are connected in a ring shape by optical transmission lines 2a to 2e to constitute a ring network.

A lot of interface cards are provided in the transmission apparatus 1a. Among the interface cards required, interface cards (OC-N cards) 3a and 3b are connected to the optical transmission lines 2a and 2e, respectively. Each of the interface cards 3a, 3b and the like are connected to a primary switch card 4a and a secondary switch card 4b, and add/drop interface cards 5a and 5b are connected to the switch cards 4a and 4b.

In the UPSR form as illustrated in FIG. 1, signal channels (synchronous transfer modules STS-1×n) assigned to node-to-node communications on the ring network correspond to a line capacity of N channels, as a whole. On the switch cards 4a and 4b in charge of line setting (cross-connect) within the transmission apparatus and various protection switching processings, when line setting is performed in the direction from the branch side (add/drop) to the network side (UPSR), a redundant configuration is adopted in which, by assigning the same channel signal to the east side (the transmission line 2a side) and the west side (the transmission line 2b side), transmission is performed via different routes on the ring network. In a transmission apparatus on the channel signal terminal side, line setting is performed in the direction from the network side to the branch side, and a route with a better line quality is selected for each path on the basis of the state of detection of a path alarm and the like of the routes.

In such a SONET/SDH optical transmission apparatus, increase in the line processing capacity of the apparatus is realized by adopting a division processing configuration using multiple chips (devices) for a cross-connect processing function.

The cross-connect processing requires connection processing for each channels (for example, STS-1) set as the unit of cross-connect processing in accordance with the same line setting information. Therefore, in a division processing method using multiple chips, processing for dividing 1-byte (8-bit) information for nibble (4-bit), dibit (2-bit) or 1-bit paths is performed, and a chip configuration suitable therefor is adopted.

That is, a two-chip configuration is adopted for the nibble processing, a four-chip configuration is adopted for the dibit processing, and an eight-chip configuration is adopted for the bit processing. In order to perform cross-connect processing for the whole line capacity which can be held by the transmission apparatus, it depends on the processing capacity of the device which performs core cross-connect processing. However, in the case where the processing capacity of one chip is not sufficient for the processing, the processing is realized, for example, by performing two-division processing as illustrated in FIG. 2.

FIG. 2 illustrates a block configuration diagram of an example of a typical switch card. In the figure, each of interface cards 21-1 to 21-n is connected to the network side or the branch side. Each of the interface cards 21-1 to 21-n performs optical-electrical conversion and electrical-optical conversion. Each interface card performs optical-electrical conversion of an optical signal received from the network side or the branch side, and provides it to a backplane interface section 24 of a switch card 23 via a backplane 22.

The backplane interface section 24 performs two-division processing (format conversion and bit array conversion) of the signals and provides the signals to cross-connect sections (TSI) 25a and 25b. The cross-connect sections 25a and 25b perform cross-connect processing and provides the signals to the backplane interface section 24.

The backplane interface section 24 performs multiplexing processing (inverse format conversion and inverse bit array conversion) of signals provided from the cross-connect sections 25a and 25b. The multiplexing-processed signals are provided for the interface cards 21-1 to 21-n via the backplane 22, electrical-optical conversion processed and outputted to the network side or the branch side.

As illustrated in FIG. 3, in the cross-connect processing operation, 1-byte information is provided for the two-chip cross-connect sections 25a and 25b by paths obtained by dividing the 1-byte information into two (in nibbles) for each channel, and the same line setting control signal is provided for the cross-connect sections 25a and 25b from a controller 27. Thereby, processing for connecting to the same channel is performed at the same time. In comparison with ordinary cross-connect processing in which processing is performed for each byte (8 bits) for each channel, virtual byte processing is realized by the cross-connect sections 25a and 25b, which are configured to perform two-division processing, performing linked processing operations for each nibble.

In FIG. 3, the expression of the signal arrays indicates the row of signals when the cross-connect division processing is performed (byte-nibble conversion) and the flow of the cross-connect processing. Each of signals a7-a0 to g7-g0 expresses a channel which is the unit targeted by the cross-connect processing. Cross-connect processing for each channel is performed for the backplane 22 by, after rearranging each signal provided from the backplane 22 side from a byte array to a nibble array, dividing the signals the MSB side and the LSB side and performing cross-connect processing at the cross-connect sections 25a and 25b and returning the array to the original byte array at the backplane interface section 24.

FIG. 4 illustrates that, since a configuration of division processing by the cross-connect sections 25a and 25b is adopted, each chip has surplus processing capability.

As a related technique, Japanese Patent Laid-Open No. 08-223241 discusses a technique in which means for stopping an auxiliary function section is provided for a transmission apparatus having a function requisite for transmitting a main signal and an auxiliary function which is not requisite, to reduce the power consumption of the apparatus.

A typical technique is provided in which, when bulk cross connect is configured using multiple racks, and a redundancy system is further configured, the number of secondary systems is reduced to reduce the power consumption of the whole system by setting the ratio of primary and secondary cross-connect means is set not as 1:1 but as 1:N.

As a technique related thereto, there is a technique disclosed in Japanese Patent Laid-Open No. 10-257580.

SUMMARY

According to an aspect of the invention, a cross-connect apparatus and method include dividing signals from a transmission line into multiple paths to provide the signals to cross-connect sections, and multiplexing signals from the cross-connect sections to send out the signals to the transmission line, where the cross-connect sections which cross-connect the signals from the interface section to output the signals to the interface and determining a number of paths divided by the interface and an operation mode of the cross-connect sections, according to a line capacity occupied by the signals from the transmission line and which controls the interface and stops an operation of a cross-connect section which does not perform cross-connect processing.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed. Additional aspects and/or advantages will be set forth in part in the description which follows and, in part, will be apparent from the description, or may be learned by practice of the invention.

BRIEF DESCRIPTION OF THE DRAWINGS

These and/or other aspects and advantages will become apparent and more readily appreciated from the following description of the embodiments, taken in conjunction with the accompanying drawings of which.

DETAILED DESCRIPTION OF EMBODIMENTS

Figure 1:
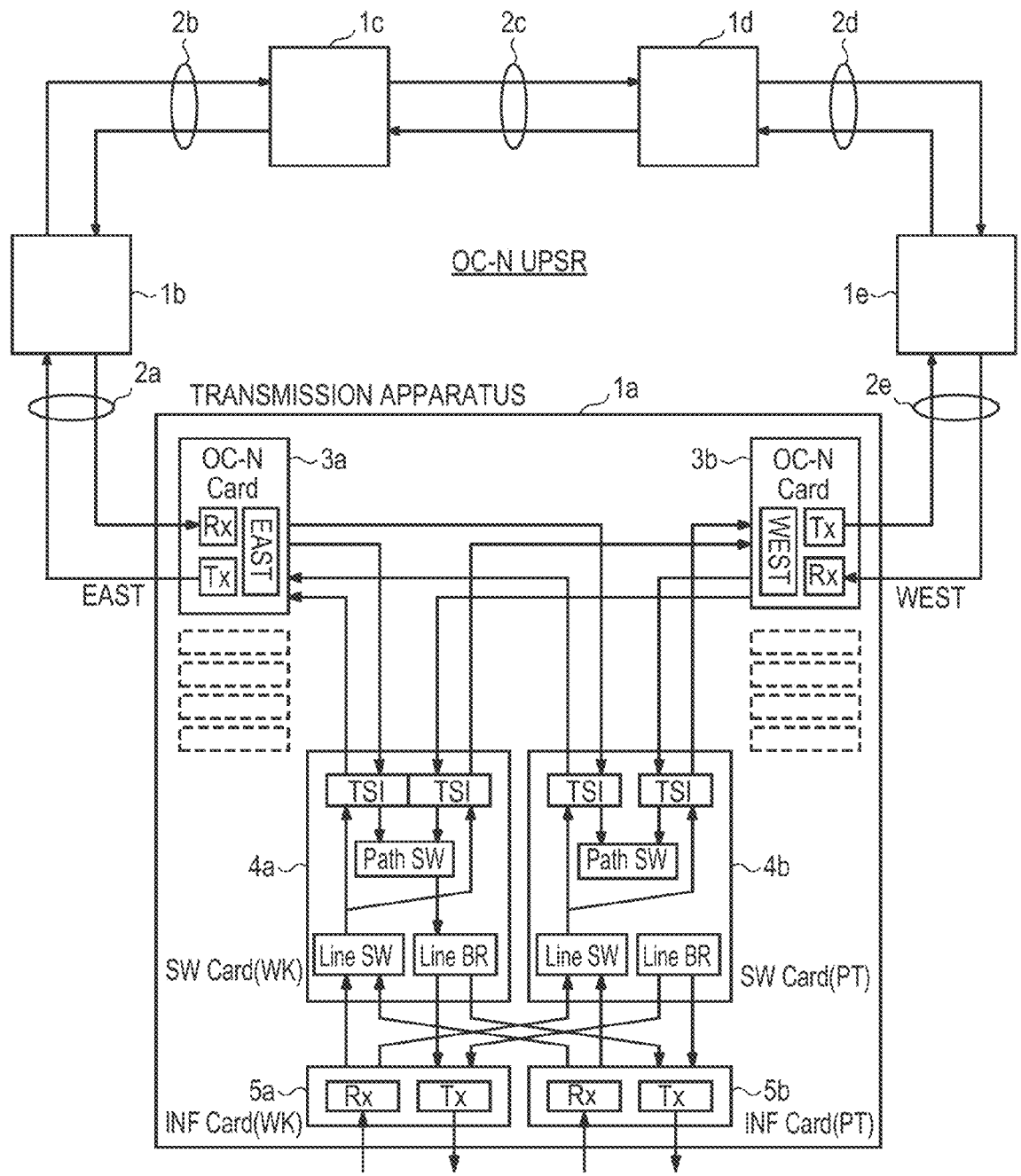
FIG. 1 is a configuration diagram of an example of a ring network.
Figure 2:
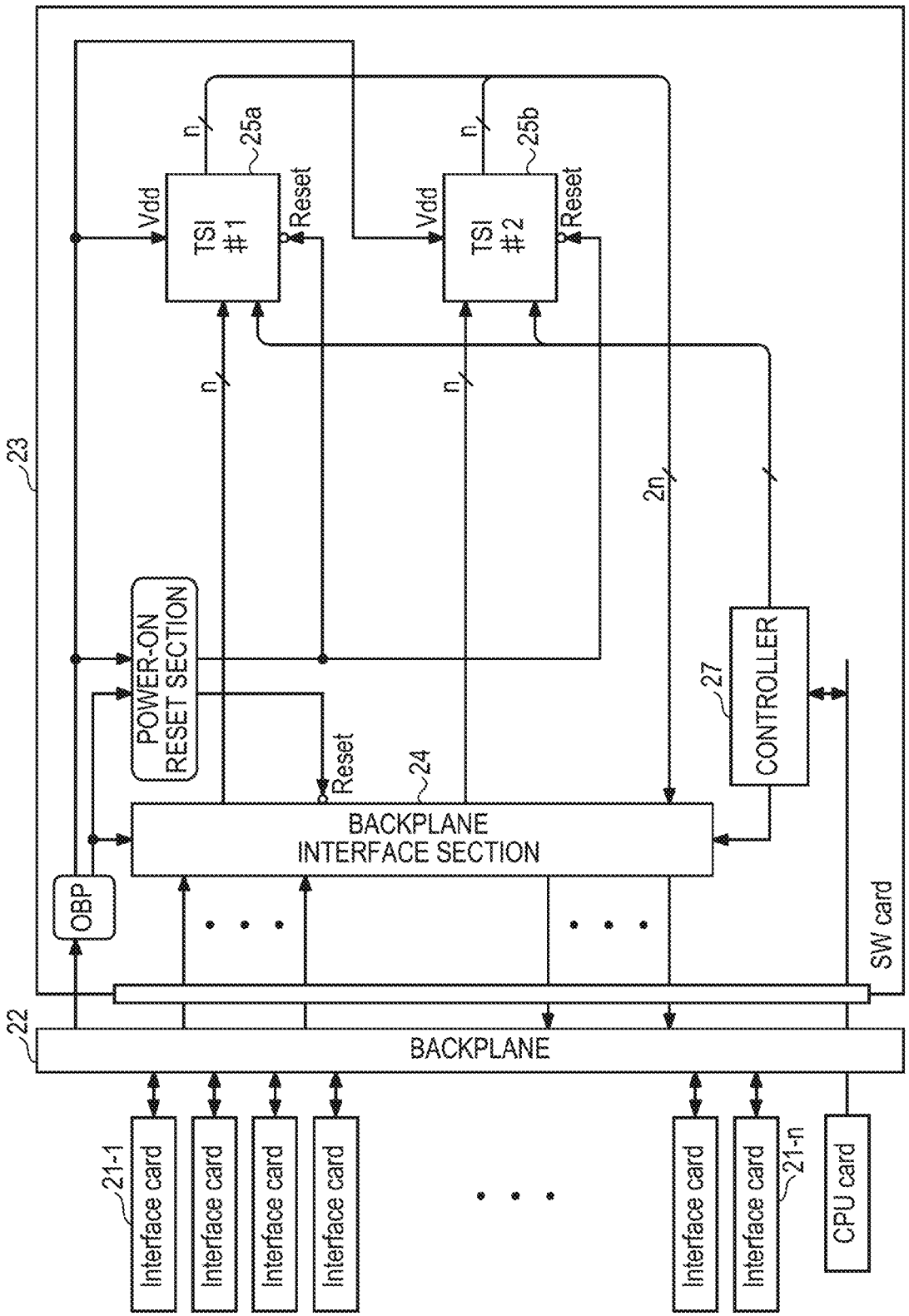
FIG. 2 is a block configuration diagram of an example of a typical switch card.

Reference will now be made in detail to the embodiments, examples of which are illustrated in the accompanying drawings, wherein like reference numerals refer to the like elements throughout. The embodiments are described below to explain the present invention by referring to the figures.

When a cross-connect division processing configuration using multiple chips is adopted in consideration of a maximum processing capacity, there may be a case where the line capacity used by a customer on the actual field does not reach even a level of half the tolerance range of a transmission apparatus. In this case, both of the cross-connect sections 25a and 25b, which are operating in the cross-connect division processing configuration, operate not a little, and thereby, wasteful power consumption occurs.

Furthermore, it is necessary to require extra equipment expenses from the customer in order to provide several kinds of switch cards with different processing capacities according to the actual line setting state. Furthermore, extra work to adjust to the circuit state, such as exchange of cards, occurs.

Figure 3:
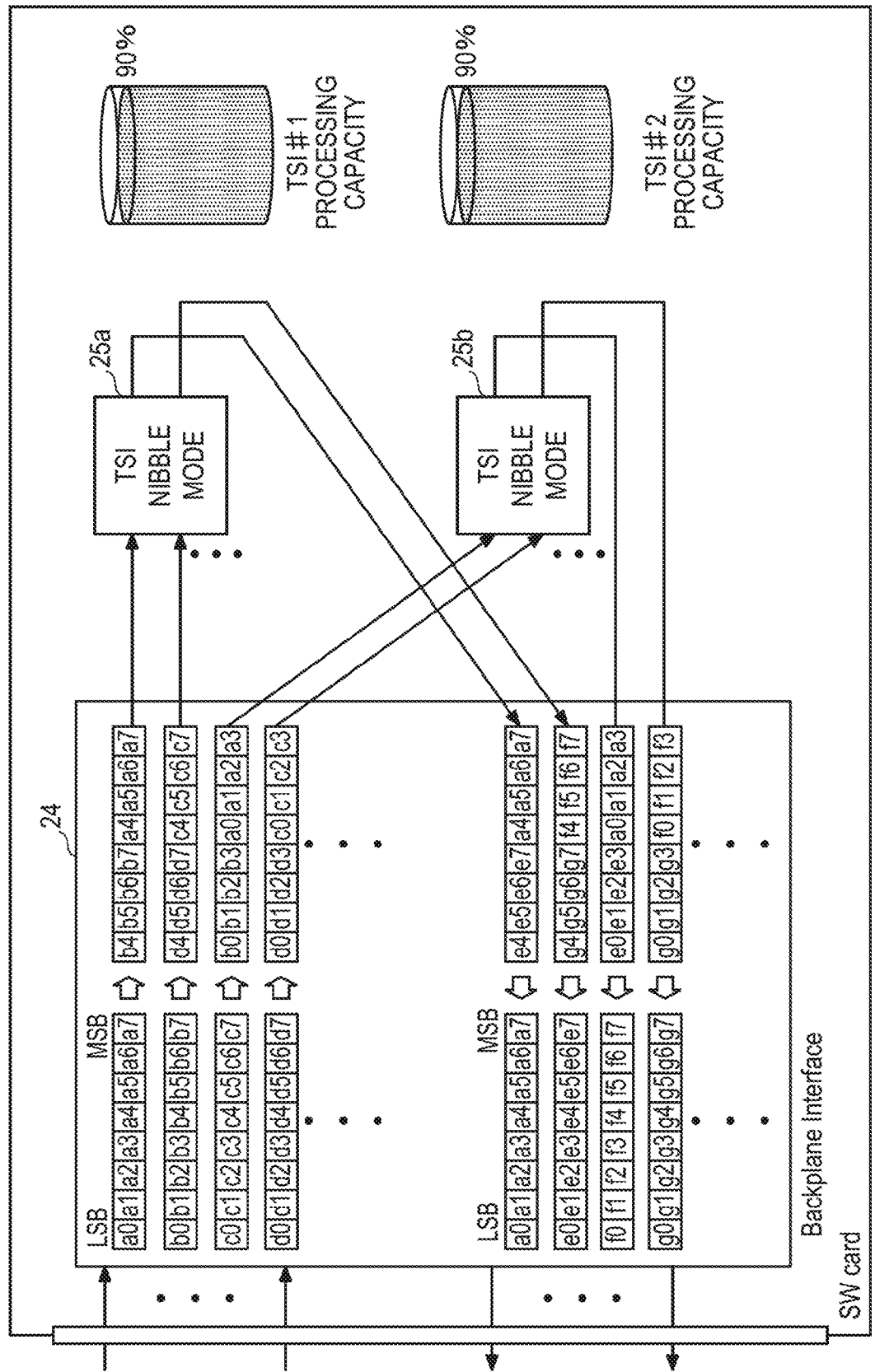
FIG. 3 is a diagram for illustrating a cross-connect processing operation.

In the typical cross-connect processing method, when the two-chip division processing configuration by the cross-connect sections 25a and 25b is adopted, separation processing is performed on the previous-stage opposite device side so that 1-byte information is separated into nibbles, and furthermore, nibble information after cross-connect processing is multiplexed to be in a byte array, as illustrated in FIG. 3.

Figure 4:
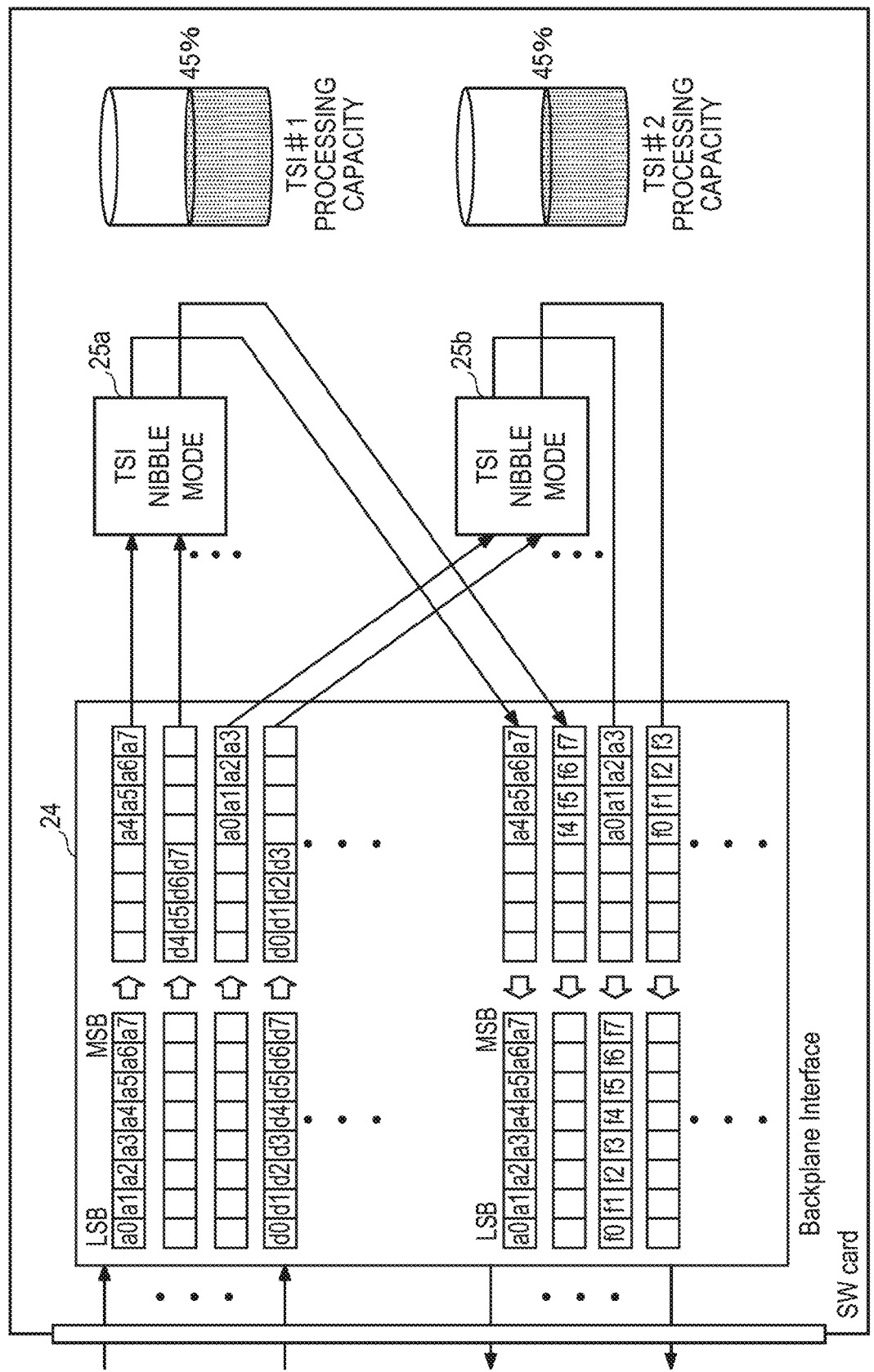
FIG. 4 is a diagram for illustrating a cross-connect processing operation.

However, the above processing method is for performing cross-connect division processing suitable for the maximum capacity of the transmission apparatus. Therefore, even in the case of the actually used line capacity which can be handled by one-chip processing (for each byte), the two-chip division processing operation is performed as illustrated in FIG. 4, and extra power consumption occurs in comparison with a single one-chip processing circuit.

In a recent CMOS device (the cross-connect sections 25a and 25b) which has been further miniaturized and for which lower voltage has been realized, leak current occurs even in a static state that the circuit is not actually operating increases exponentially, and the rate of the leak current reaches about half the whole current. In such a situation, since the multiple-chip CMOS devices are continuously operating even when the circuit operation rate decreases according to the processing capacity, there is a problem that wasteful power consumption occurs in comparison with the one-chip cross-connect processing configuration capable of handling the same processing capacity.

Embodiments will be described below on the basis of drawings.

Figure 5:
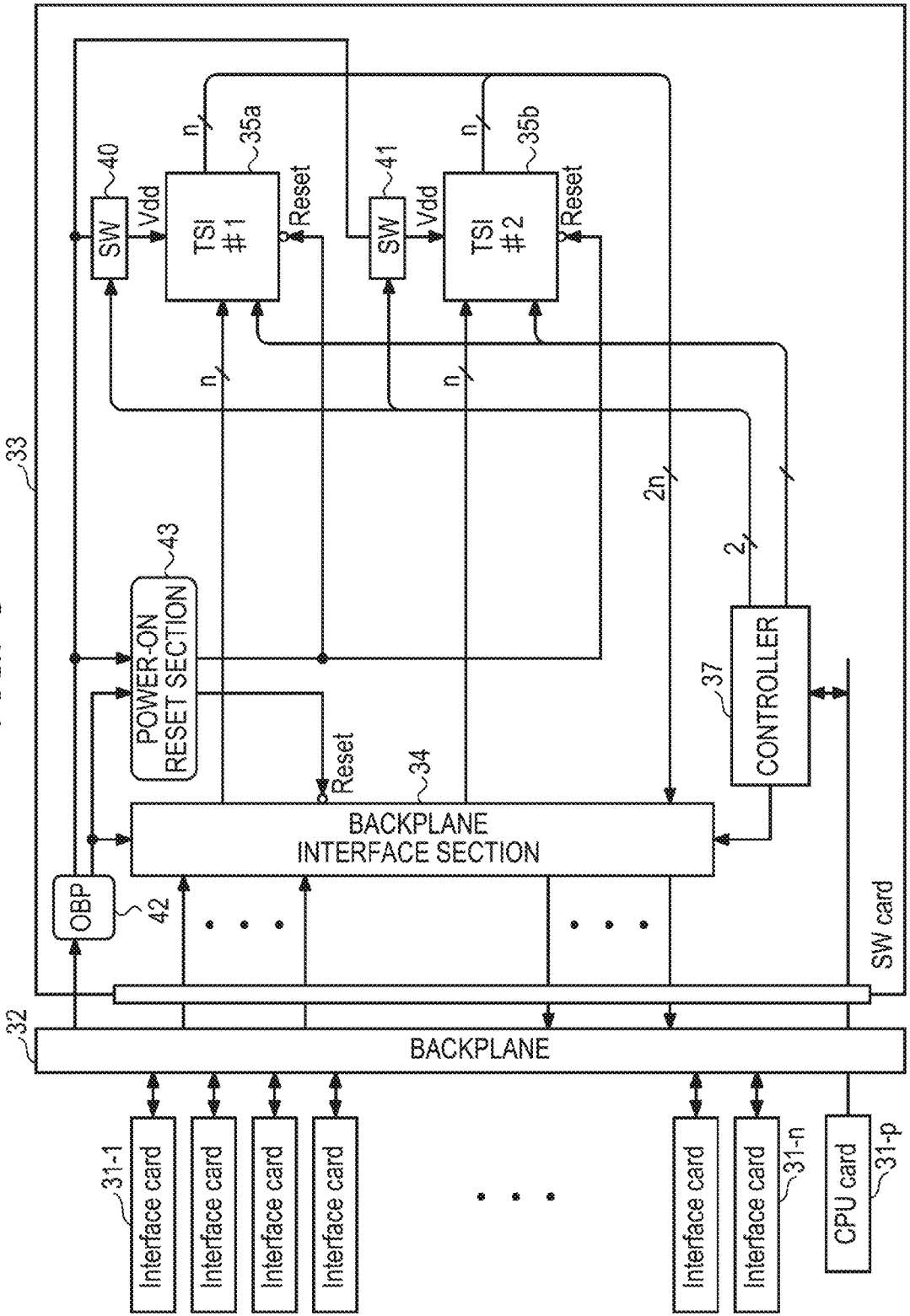
FIG. 5 is a block configuration diagram of an embodiment of a switch card.

FIG. 5 illustrates a block configuration diagram of an embodiment of a switch card. In the figure, each of interface cards 31-1 to 31-n is connected to the network side or the branch side. Each of interface cards 31-1 to 31-n performs optical-electrical conversion and electrical-optical conversion. Each interface card performs optical-electrical conversion of optical signals received from the network side or the branch side, and provides it to a backplane interface section 34 of a switch card 33 via a backplane 32.

The backplane interface section 34 performs two-division processing (format conversion and bit array conversion) of the signals in accordance with a cross-connect processing mode (a nibble mode or a byte mode) specified from a controller 37 and provides the signals to cross-connect sections (TSI) 35a and 35b, or provides the signals, for example, to the cross-connect section 35a without performing the two-division processing of the signals.

The cross-connect sections 35a and 35b perform cross-connect processing in accordance with the cross-connect processing mode specified from the controller 37 and provide the signals to the backplane interface section 34.

The backplane interface section 34 performs multiplexing processing (inverse format conversion and inverse bit array conversion) of signals provided from the cross-connect sections 35a and 35b. The multiplexing-processed signals are provided for the interface cards 31-1 to 31-n via the backplane 32, electrical-optical conversion processed and outputted to the network side or the branch side.

In the cross-connect processing operation in the nibble mode, 1-byte information is divided into two (in nibbles) for the two-chip cross-connect sections 35a and 35b, and, in that state, the same line setting control signal is provided for the cross-connect sections 35a and 35b from the controller 37. Thereby, processing for connecting to the same channel is performed at the same time.

The number of pattern wirings on the printed circuit board between the backplane interface section 34 and the cross-connect sections 35a and 35b is determined on the basis of the device-to-device transmission rate (signal speed) for all the channels (the line capacity). In FIG. 5 illustrating the two-division processing configuration, a connection configuration is shown in which the number of wirings for each of the cross-connect sections 35a and 35b is n/2, where the total number of wirings is denoted by n.

From the actually used line capacity provided for the backplane interface section 34 from all the interface cards 31-1 to 31-n, the controller 37 judges whether the actually used line capacity is such a line capacity that requires the two-chip cross-connect sections 35a and 35b or the actual capacity is such a line capacity that processing can be performed by a one-chip cross-connect section 35a or 35b. Then, the controller 37 selectively sets the nibble mode as the cross-connect processing mode when two chips are required, and the byte mode when one chip is enough to perform processing, and provides the set cross-connect processing mode for the backplane interface section 34. Furthermore, the controller 37 also generates a control signal (for example, a high-level control signal) for instructing turning-on in the byte mode and the nibble mode and provides it for a switch 40, and it generates a control signal (for example, a high-level control signal) for instructing turning-on only in the nibble mode and provides it for a switch 41.

The switches 40 and 41 provide power supply from a power supply circuit 42 for the cross-connect sections 35a and 35b. The switch 40 is turned on in the byte mode and in the nibble mode, and the switch 41 is turned on only in the nibble mode.

A power-on reset section 43 generates a low-level power-on reset signal only during a predetermined time period after power supply is detected, and provides the power-on reset signal for the reset terminal of each of the backplane interface section 34, the cross-connect sections 35a and 35b. When the low-level power-on reset signal is provided, each of the cross-connect sections 35a and 35b stops its operation and is initialized.

In this way, when the actually used line capacity is such that processing can be performed by a one-chip cross-connect section, the byte mode is set and the cross-connection processing is performed by one cross-connect section 35a, and the power supply for the other cross-connect section 35b is stopped. Thereby, the power consumption of the switch card 33 can be reduced.

Figure 6:
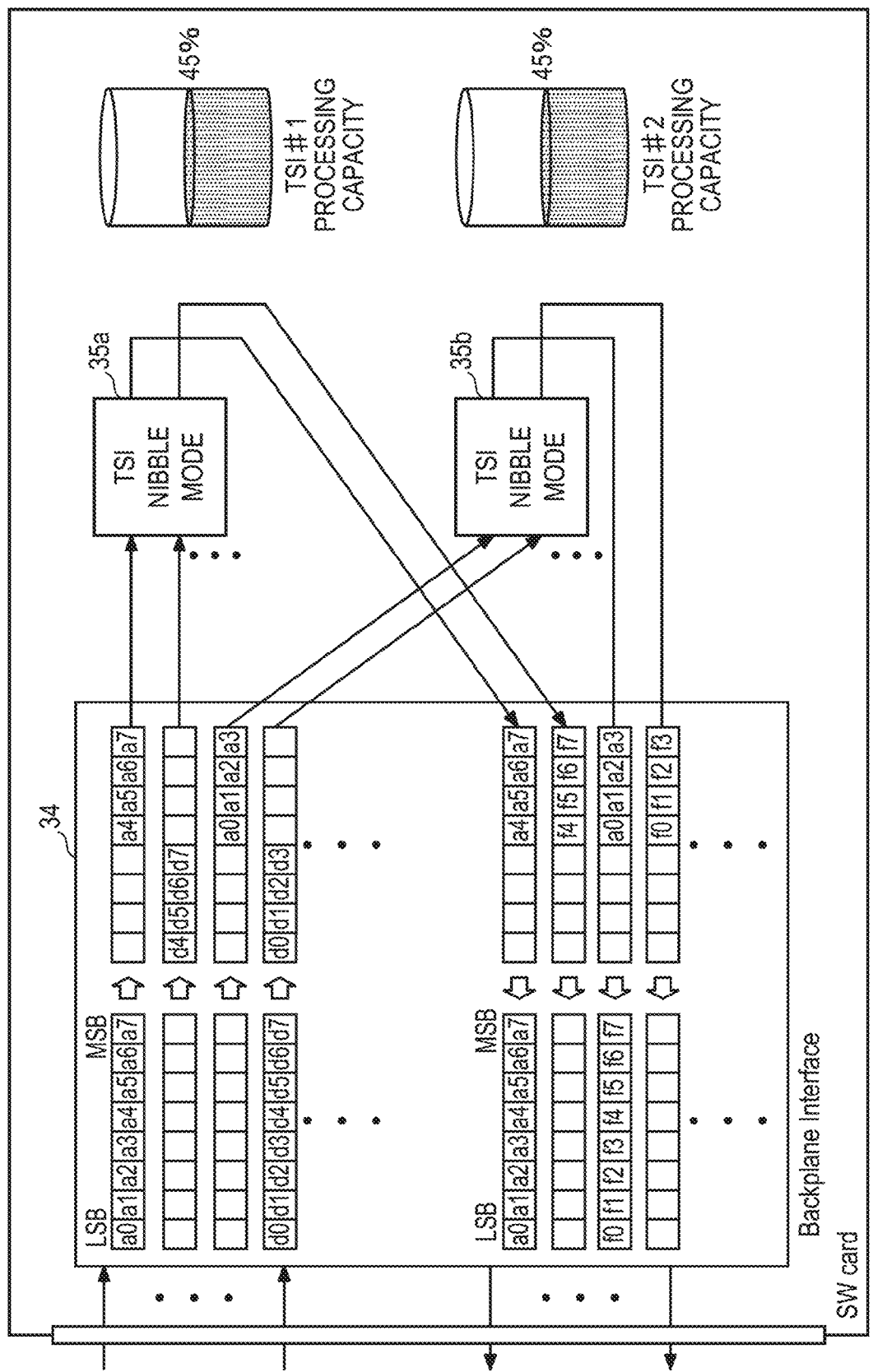
FIG. 6 is a diagram for illustrating a cross-connect processing operation.

As illustrated in FIG. 6, in the cross-connect processing operation, 1-byte information is provided for the two-chip cross-connect sections 35a and 35b by paths obtained by dividing the 1-byte information into two (in nibbles) for each channel, from the backplane interface section 34, and the same line setting control signal is provided for the cross-connect sections 35a and 35b from the controller 37. Thereby, processing for connecting to the same channel is performed at the same time. Cross-connect processing for each channel is performed for the backplane 32 by, after rearranging each signal provided from the backplane 32 side from a byte array to a nibble array, dividing the signal as the MSB side and the LSB side and performing cross-connect processing at the cross-connect sections 35a and 35b and returning the array to the original byte array by multiplexing at the backplane interface section 34.

As illustrated in FIG. 6, when the line capacity used by the customer on the field does not reach a level of half a tolerance range of the transmission apparatus in the nibble mode, the controller 37 sets the byte mode as the cross-connect processing mode.

Figure 7:
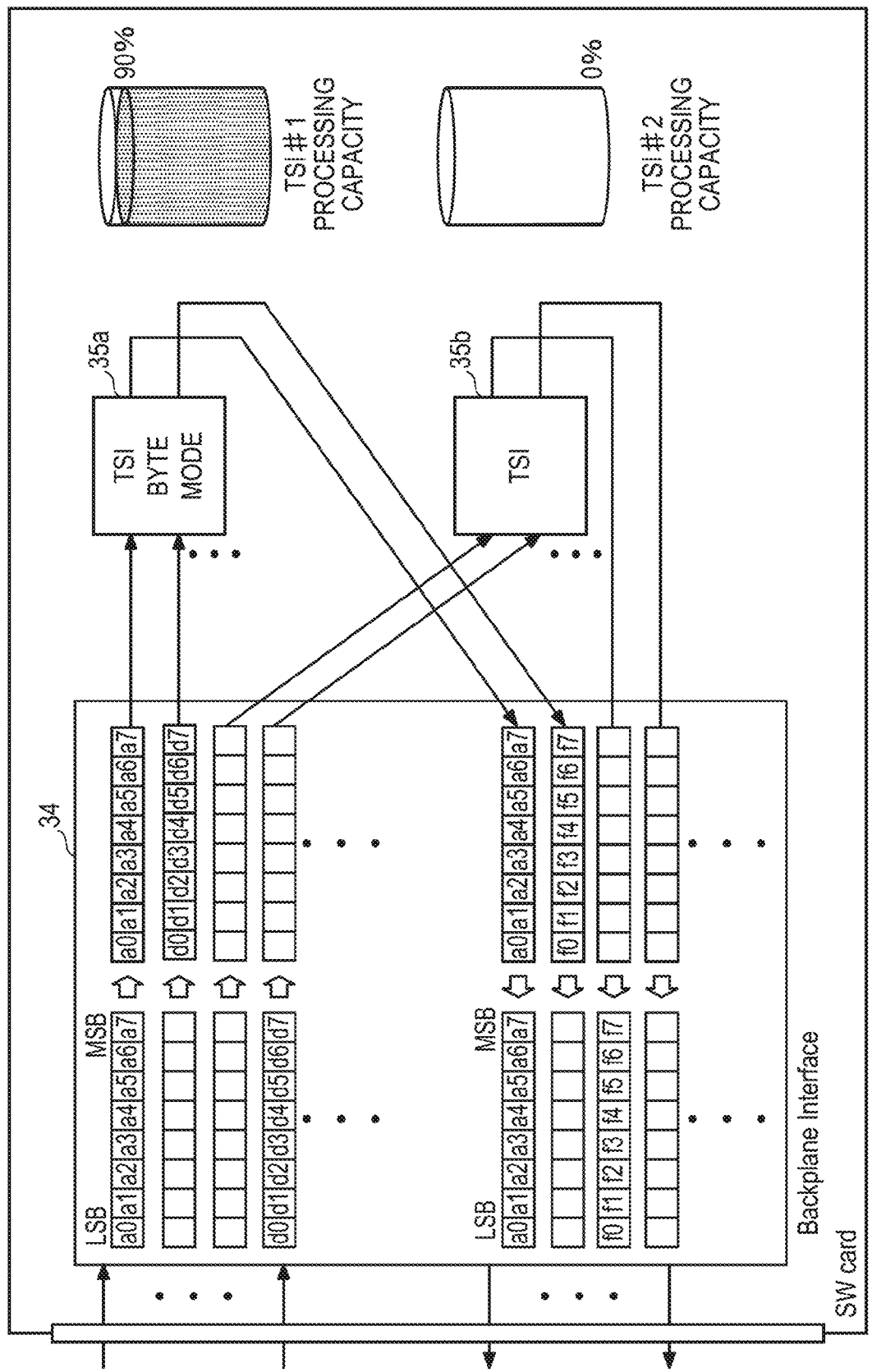
FIG. 7 is a diagram for illustrating a cross-connect processing operation.

Thereby, 1-byte information for each signal channel is provided for the single cross-connect section 35a and cross-connect processed without being divided, as illustrated in FIG. 7. Since the power supply for the cross-connect section 35b is stopped, the power consumption of the switch card 33 can be reduced.

In the above embodiment, switching between the nibble mode and the byte mode has been described. Between the dibit mode and the nibble mode, similar switching can be also performed.

Figure 8:
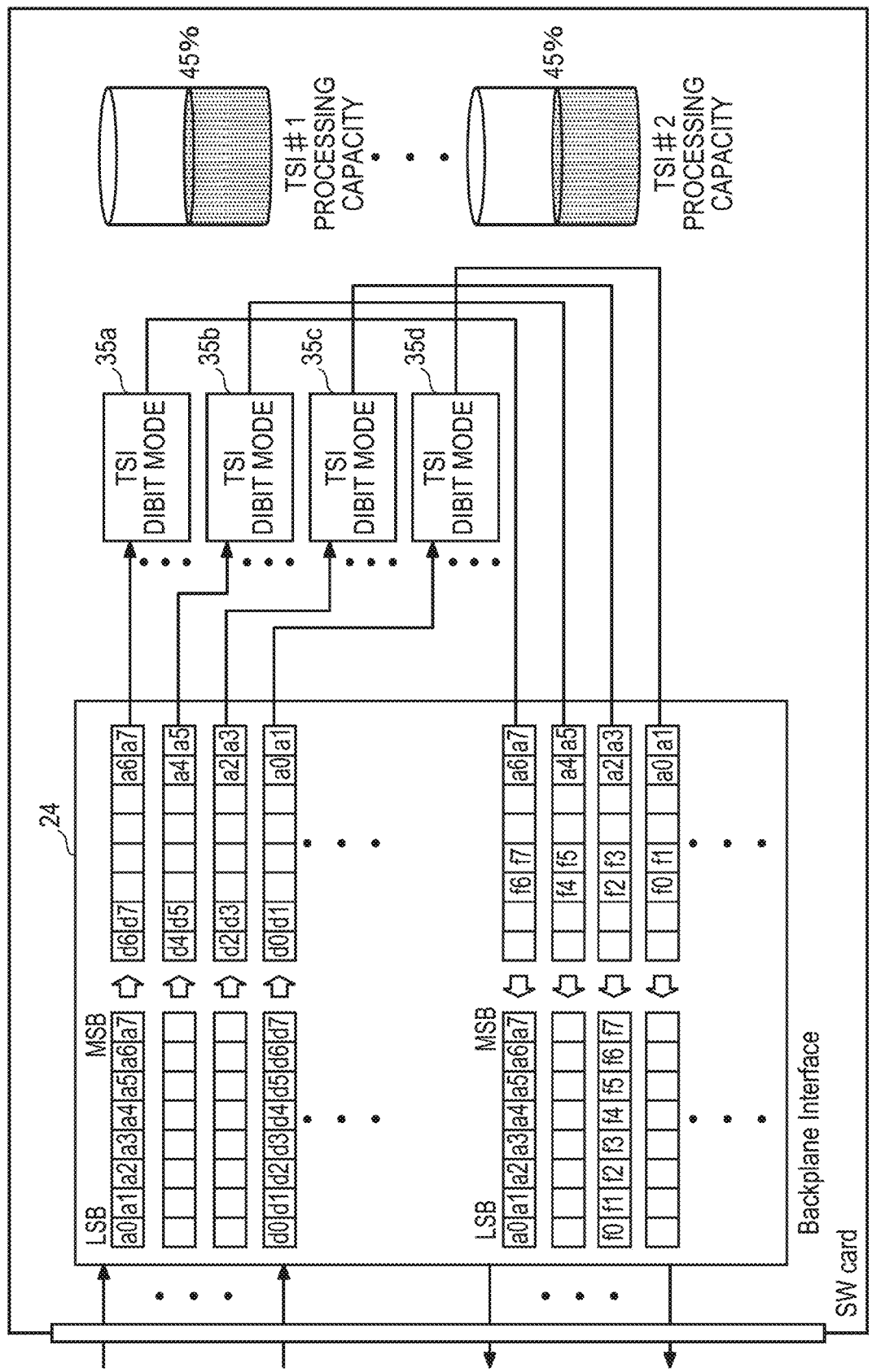
FIG. 8 is a diagram for illustrating a cross-connect processing operation.

As illustrated in FIG. 8, the backplane interface section 34 provides 1-byte information for the four-chip cross-connect sections 35a 35b, 35c and 35d by paths obtained by dividing the 1-byte information into four (in dibits) for each channel, and the same line setting control signal is provided for the cross-connect sections 35a, 35b, 35c and 35d from the controller 37. Thereby, passing for connecting to the same channel is performed at the same time.

When the line capacity used by the customer on the actual field does not reach the level of half the tolerance range of the transmission apparatus in the dibit mode, the controller 37 sets the nibble mode as the cross-connect processing mode.

Figure 9:
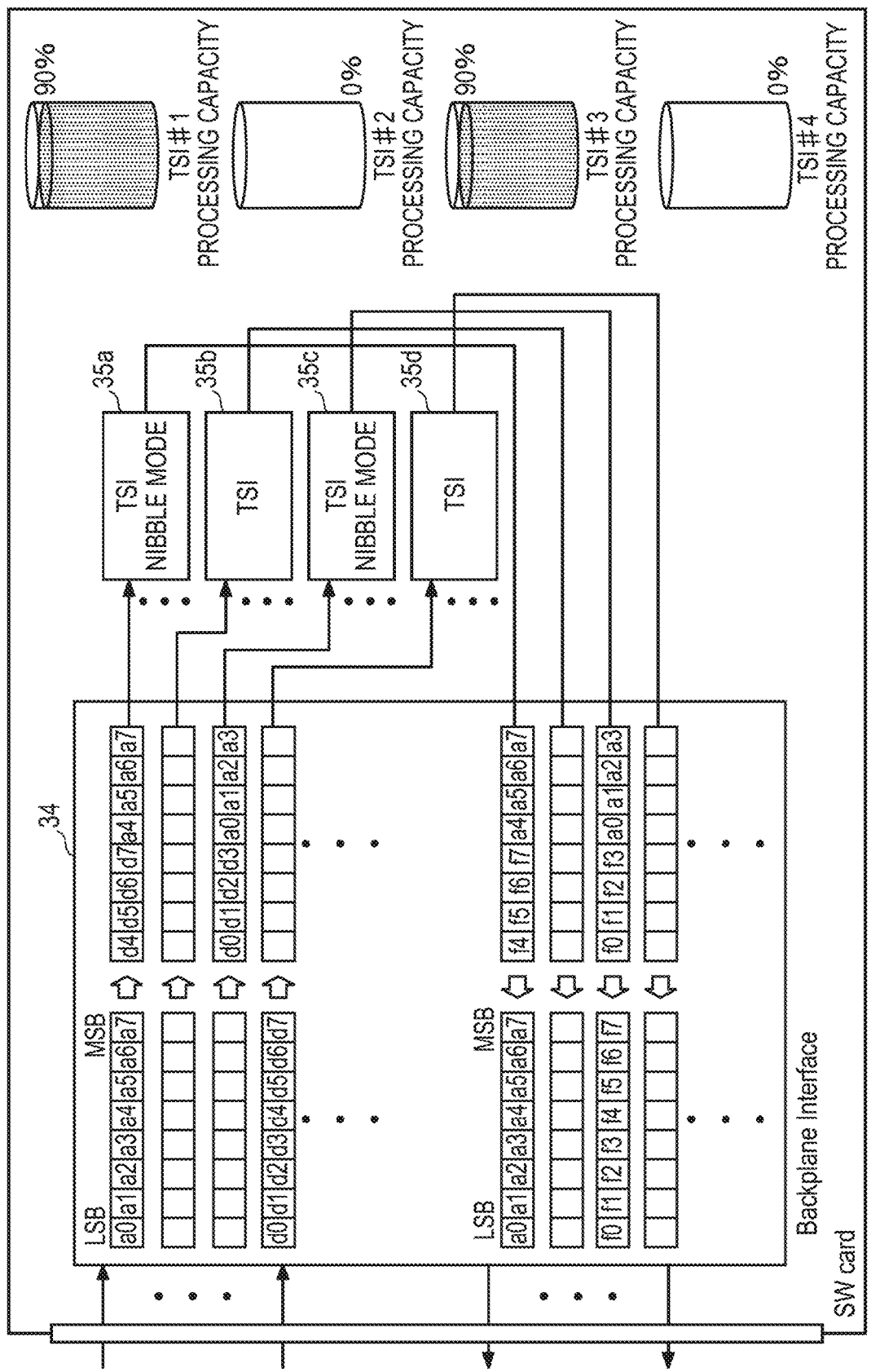
FIG. 9 is a diagram for illustrating a cross-connect processing operation.

Thereby, as illustrated in FIG. 9, 1-byte information is provided for the two-chip cross-connect sections 35a and 35c by paths obtained by dividing the 1-byte information into two (in nibbles) for each channel, and the same line setting control signal is provided for the cross-connect sections 35a and 35c from the controller 37. Thereby, processing for connecting to the same channel is performed at the same time. Then, by stopping the power supply for the cross-connect sections 35b and 35d, the power consumption of the switch card 33 can be reduced.

Furthermore, switching between the bit mode and the dibit mode can be performed similarly to the above switching between the dibit mode and the nibble mode. In this case, in the bit mode, 1-byte information is provided for the eight-chip cross-connect sections by paths obtained by dividing the 1-byte information into eight (in bits) for each channel, and the same line setting control signal is provided for the eight-chip cross-connect sections from the controller 37. Thereby, processing for connecting the same channel is performed at the same time.

When the line capacity used by the customer on the actual field (current usage) does not reach a level of half a tolerance range of the transmission apparatus in the bit mode, the controller 37 sets the dibit mode as the cross-connect processing mode. Thereby, 1-byte information is provided for the four-chip cross-connect sections by paths obtained by dividing the 1-byte information into four (in dibits) for each channel, and the same line setting control signal is provided for the four-chip cross-connect sections from the controller 37. Thereby, processing for connecting to the same channel is performed at the same time. By stopping the power supply for the remaining four-chip cross-connect sections, the power consumption of the switch card 33 can be reduced. Processing capacity of a transmission line may be monitored based on various techniques.

Figure 10:
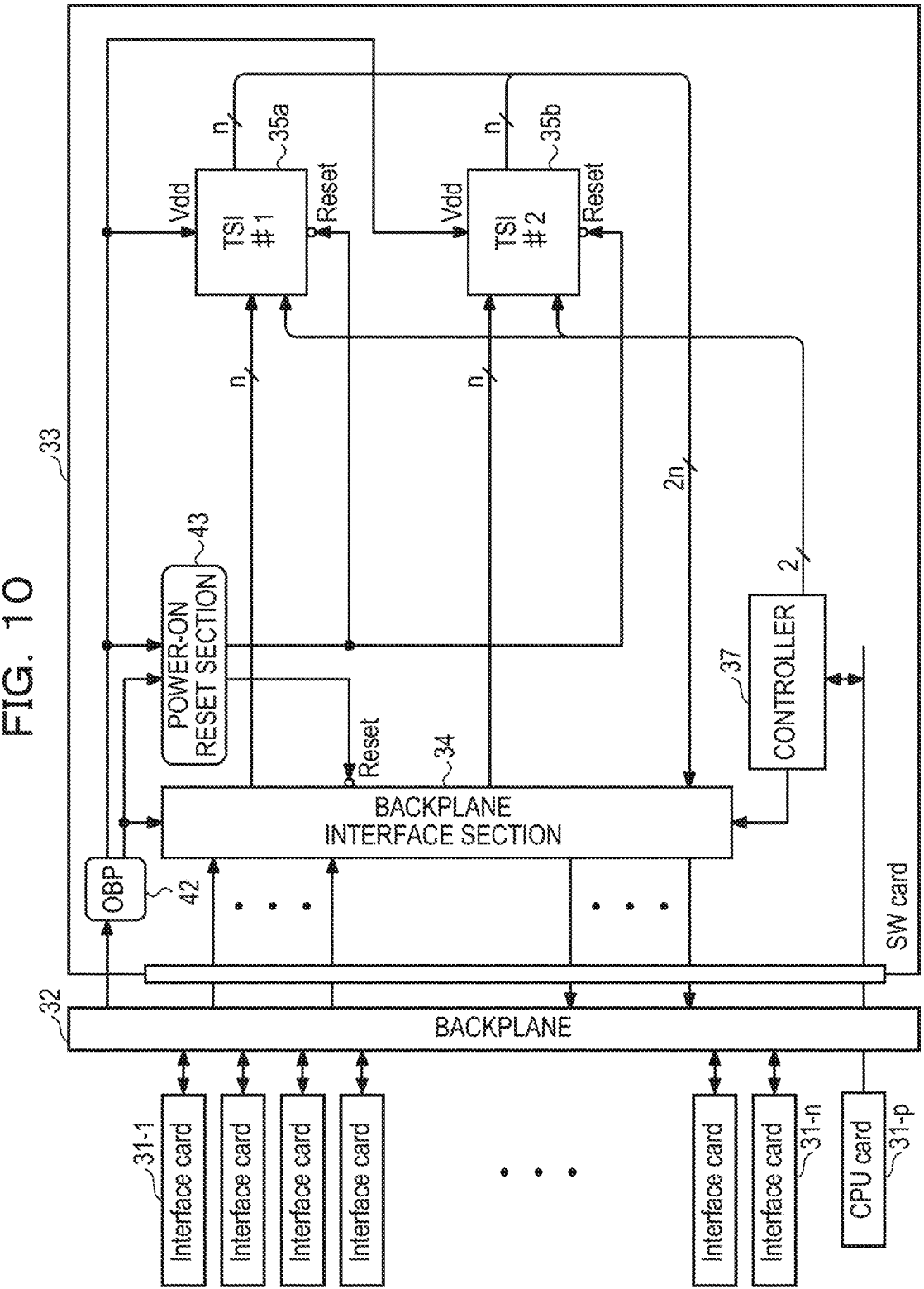
FIG. 10 is a block configuration diagram of an embodiment of the switch card.

FIG. 10 illustrates a block configuration diagram of an embodiment of the switch card. In the figure, the same sections as those in FIG. 5 are given the same reference numerals. In FIG. 10, power supply from the power supply circuit 42 is directly supplied for the cross-connect sections 35a and 35b, and a control signal (for example, a high-level control signal) for instructing turning-on in the byte mode and the nibble mode from the controller 37 is provided for the cross-connect section 35a, and a control signal (for example, a high-level control signal) for instructing turning-on only in the nibble mode is provided for the cross-connect section 35b.

The cross-connect sections 35a and 35b are semiconductor chips (devices) which perform an operation when a high-level control signal is provided for an enable terminal and transition into a sleep mode, which is a low power consumption state, when a low-level control signal is provided to the enable terminal.

In this variation embodiment also, when the actually used line capacity is such that processing can be performed by a one-chip cross-connect section, the byte mode is set and the cross-connection processing is performed by one cross-connect section 35a, and the other cross-connect section 35b is caused to be in a low power consumption state. Thereby, the power consumption of the switch card 33 can be reduced.

Figure 11:
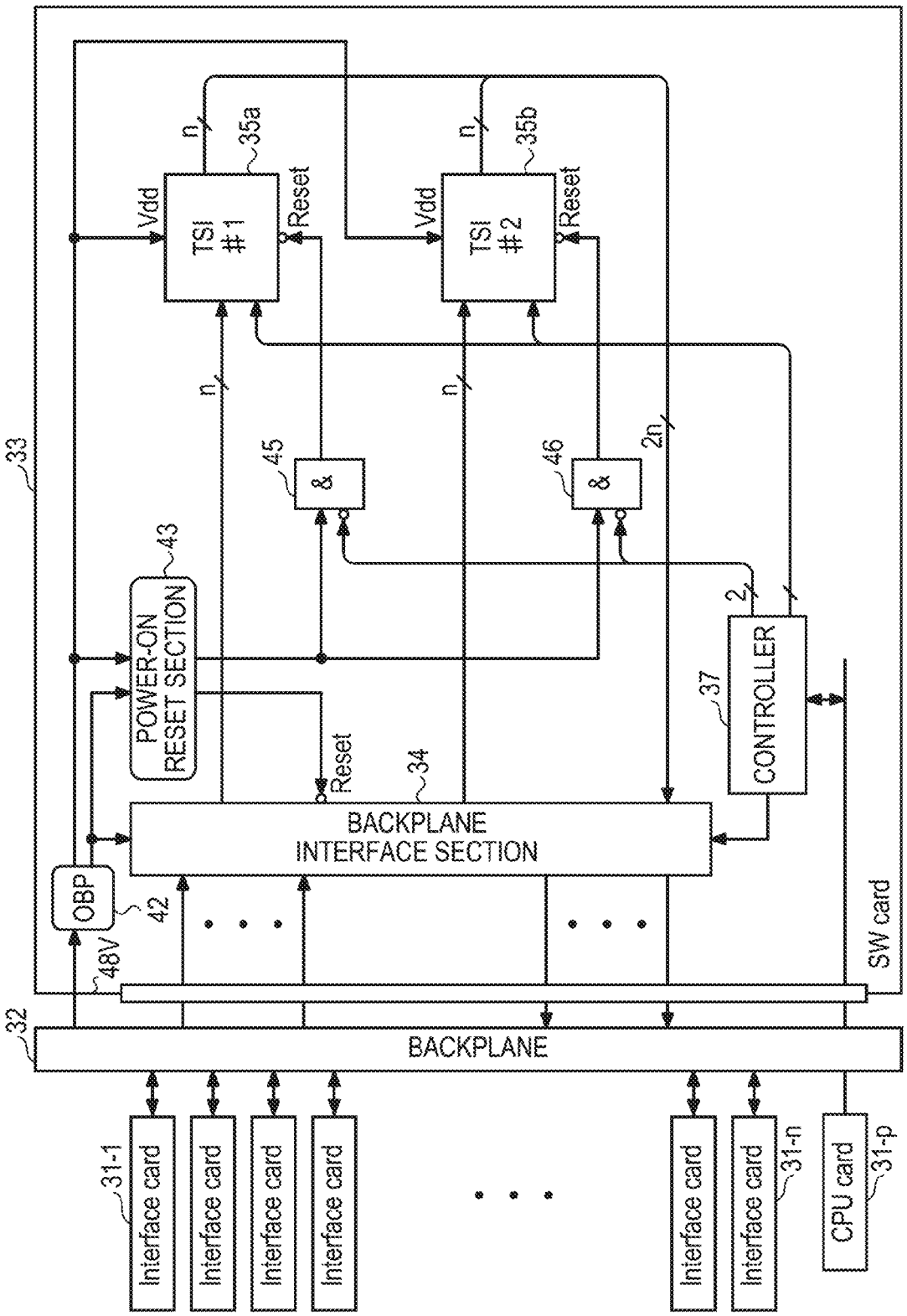
FIG. 11 is a block configuration diagram of an embodiment of the switch card.

FIG. 11 illustrates a block configuration diagram of an embodiment of the switch card. In the figure, the same sections as those in FIG. 5 are given the same reference numerals. In FIG. 11, power supply from the power supply circuit 42 is directly supplied for the cross-connect sections 35a and 35b, and a control signal (for example, a low-level control signal) for instructing turning-on in the byte mode and the nibble mode from the controller 37 is provided for the reverse input terminal of an AND circuit 45, and a control signal (for example, a low-level control signal) for instructing turning-on only in the nibble mode is provided for the reverse input terminal of an AND circuit 46.

The AND circuits 45 and 46 provide a power-on reset signal from the power-on reset section 43 and the AND operation result of the control signal for the reset terminal of each of the cross-connect sections 35a and 35b. Thereby, in the nibble mode, a low-level signal is provided for the reset terminal of the cross-connect section 35b, so that the cross-connect section 35b is caused to be in a reset state and stops its operation. Thereby, power consumption is reduced.

In this variation embodiment also, when the actually used line capacity is such that processing can be performed by a one-chip cross-connect section, the byte mode is set and the cross-connection processing is performed by one cross-connect section 35a, and the power consumption of the other cross-connect section 35b is reduced. Thereby, the power consumption of the switch card 33 can be reduced.

Figure 12:
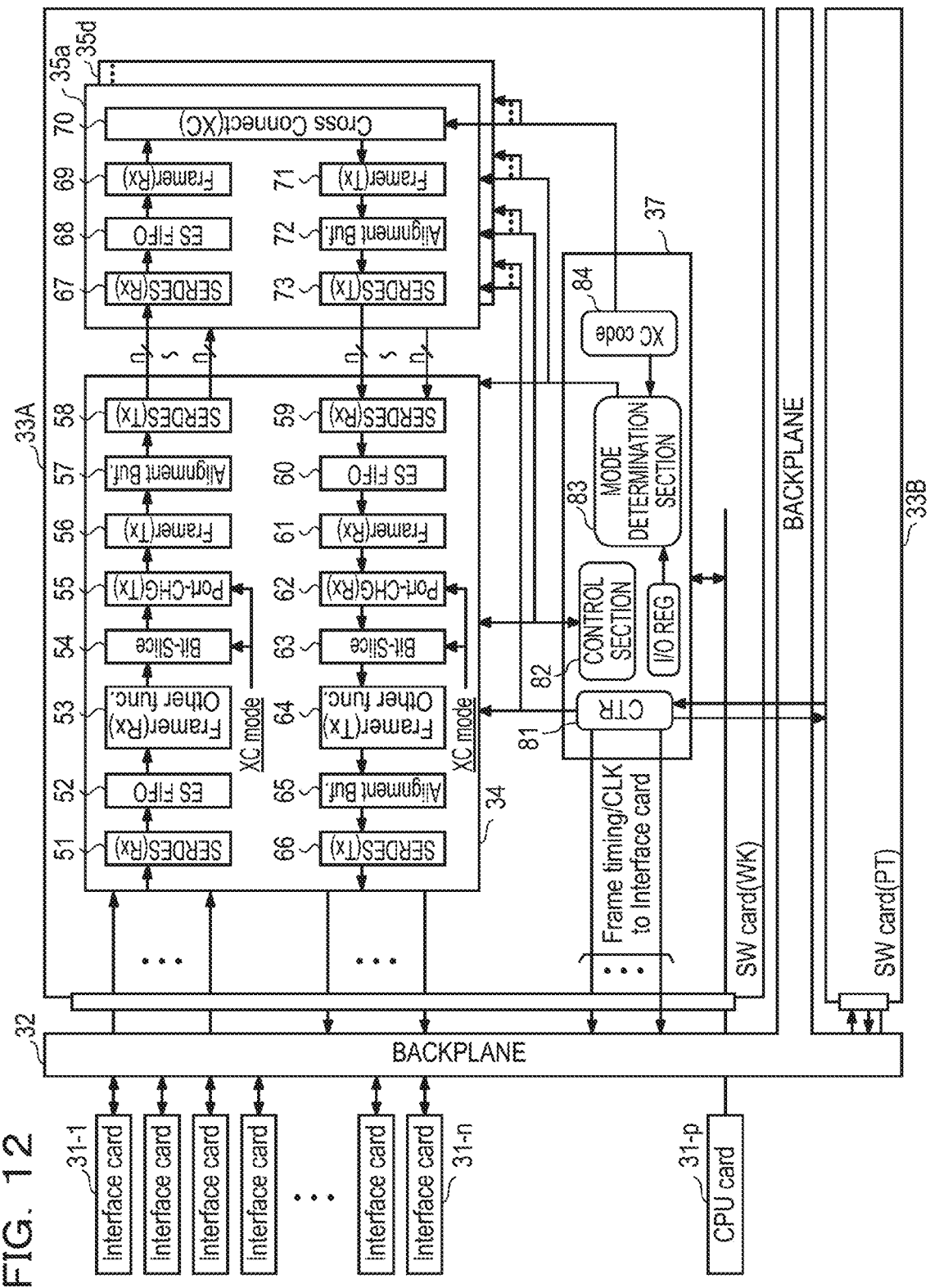
FIG. 12 is a circuit configuration diagram of an embodiment of the switch card.

FIG. 12 illustrates a circuit configuration diagram of an embodiment of the switch card. In the figure, the same sections as those in FIG. 5 and the like are given the same reference numerals. Here, switch cards 33A and 33B connected to the backplane 32 are in the same configuration as that of the switch card 33 described before. The switch card 33A and the switch card 33B perform the same operation in synchronization with each other, as primary and secondary systems, respectively.

The switch cards 33A and 33B perform an operation of switching between the two-division processing configuration in the nibble mode and the four-division processing configuration in the dibit mode. It is also possible to change the configuration so that a similar switching operation is performed in the 8-division processing configuration in the bit mode.

The backplane interface section 34 of the switch card 33A collects all cross-connect target main signals from the interface cards 31-1 to 31-n in charge of transmission/receiving processing for network lines (transmission lines) via the backplane 32, and it has various necessary processing functions, including various kinds of redundancy switching (lines or paths), in addition to the cross-connect processing, as the functions of a transmission apparatus.

A SERDES section 51 in the backplane interface section 34 performs serial-parallel conversion of the cross-connect target main signals provided from the backplane 32, and provides them for a FIFO section 52. The FIFO section 52 synchronizes the serial signals with an internal clock, absorbs skew and provides the signals for a framer section 53.

The framer section 53 converts the serial signals into a format suitable for a subsequent-stage bit-slice section 54 and provides the signals for the bit-slice section 54. The bit-slice section 54 performs byte-nibble conversion, byte-dibit conversion or no conversion for each channel, and provides obtained paths to a port change section 55. The port change section 55 switches the route for outputting the paths for division processing and provides the paths for a framer section 56.

The framer section 56 converts the signals into a format suitable for serial transmission and provides the signals for a buffer 57. The buffer 57 performs clock timing change for performing serial transmission and provides the signals for a SERDES section 58. The SERDES section 58 performs parallel-serial conversion to perform serial transmission and sends out the signals to the cross-connect sections 35a to 35d.

A SERDES section 59 performs serial-parallel conversion of the signals received from the cross-connect sections 35a to 35d and provides them for a FIFO section 60. The FIFO section 60 synchronizes the serial signals with the internal clock, absorbs skew and provides the signals for a framer section 61.

The framer section 61 converts the serial signals into a format suitable for a subsequent-stage bit-slice section 63 and provides the signals for a port change section 62. The port change section 62 switches the route for outputting paths for multiplexing processing and provides the signals for the bit-slice section 63. The bit-slice section 63 performs byte-nibble inverse conversion, byte-dibit inverse conversion or no conversion for each channel, and provides the signals to a framer section 64.

The framer section 64 converts the signals into a format suitable for transmission to each of the interface cards 31-1 to 31-n and provides the signals for a buffer 65. The buffer 65 performs clock timing change for performing transmission and provides the signals for a SERDES section 66. The SERDES section 66 performs parallel-serial conversion to perform serial transmission to each interface card and sends out the signals to the interface cards 31-1 to 31-n.

In each of the cross-connect sections 35a to 35d, a SERDES section 67 performs serial-parallel conversion of the signals provided from the backplane interface section 34 and provides the signals for a FIFO section 68. The FIFO section 68 synchronizes the serial signals with the internal clock and provides the signals for a framer section 69.

The framer section 69 converts the serial signals into a format suitable for cross-connection and provides the signals for a cross-connect circuit 70. The cross-connect circuit 70 performs cross-connect processing of the signals and provides the signals for a framer section 71.

The framer section 71 converts the signals into a format suitable for transmission to the backplane interface section 34 and provides the signals for a buffer 72. The buffer 72 performs clock timing change for performing transmission and provides the signals for a SERDES section 73. The SERDES section 66 performs parallel-serial conversion to perform serial transmission to each interface card and sends out the signals to the backplane interface section 34.

The FIFO's 52, 60 and 62 provided for the receiving section of each of the devices, the backplane interface section 34 and the cross-connect sections 35a to 35d absorb latency (propagation delay time on the cross-connect sections 35a to 35d) different for each cross-connect processing mode, in addition to transmission skew. The buffers 57, 65 and 72 provided for the transmission section of each device are provided to perform clock change.

In the controller 37, a counter (CTR) 81 generates various timing signals used by each section of the switch card 33A and the backplane 32 and provides the timing signals for each section of the switch card 33A and the backplane 32.

The controller 37 in the primary switch card 33A synchronizes the switch cards 33A and 33B by providing a timing signal for the controller 37 in the secondary switch card 33B. In this case, the counter 81 of the primary switch card 33A is in a self-running state, and the counter 81 of the secondary switch card 33B is in a subordinately synchronized state.

A control section 82 generates various control signals and provides them for each of the backplane interface section 34 and the cross-connect sections 35a to 35d.

A mode determination section 83 determines the cross-connect processing mode from among the byte mode, the nibble mode and the dibit mode on the basis of line setting information from a line setting section 84, and specifies the cross-connect processing mode to each of the bit-slice sections 54 and 63 and the port change sections 55 and 62 of the backplane interface section 34, and the cross-connect sections 35a to 35d. The mode determination section 83 may be configured to determine the cross-connect processing mode on the basis of an instruction from a CPU card 31-p which is a control section in the transmission apparatus.

Each of the cross-connect sections 35a to 35d controls on/off of power supply on the basis of the cross-connect processing mode. For example, in the byte mode, the cross-connect sections 35b to 35d turn off the power supply, and the cross-connect section 35a turns on the power supply. In the nibble mode, the cross-connect sections 35b and 35d turn off the power supply, and the cross-connect sections 35a and 35c turn on the power supply. In the dibit mode, all the cross-connect sections 35a to 35d turn on the power supply.

Line setting information about each of the cross-connect sections 35a to 35d is set for the line setting section 84 by the CPU card 31-p, and the line setting section 84 notifies this line setting information to each of the cross-connect sections 35a to 35d.

When the actually used line capacity (current usage) decreases, and the cross-connect processing mode is changed (adjusted) from the nibble mode to the byte mode so that processing is performed by the single one-chip cross-connect processing section 35a, the processing operations of the cross-connect sections 35b to 35d are stopped by the bit-slice section 54 releasing the byte-nibble conversion (no conversion) and the port change section 55 performing route switching for performing output to the cross-connect section 35a, so that the power consumption of these is reduced.

The cross-connect processing mode switching control by the mode determination section 83 is performed by judging the actually used line capacity from the line setting information notified from the line setting section 84 in the controller 37. Otherwise, the switching is performed on the basis of an instruction from the CPU card 31-p which is a control section in the transmission apparatus.

Figure 13:
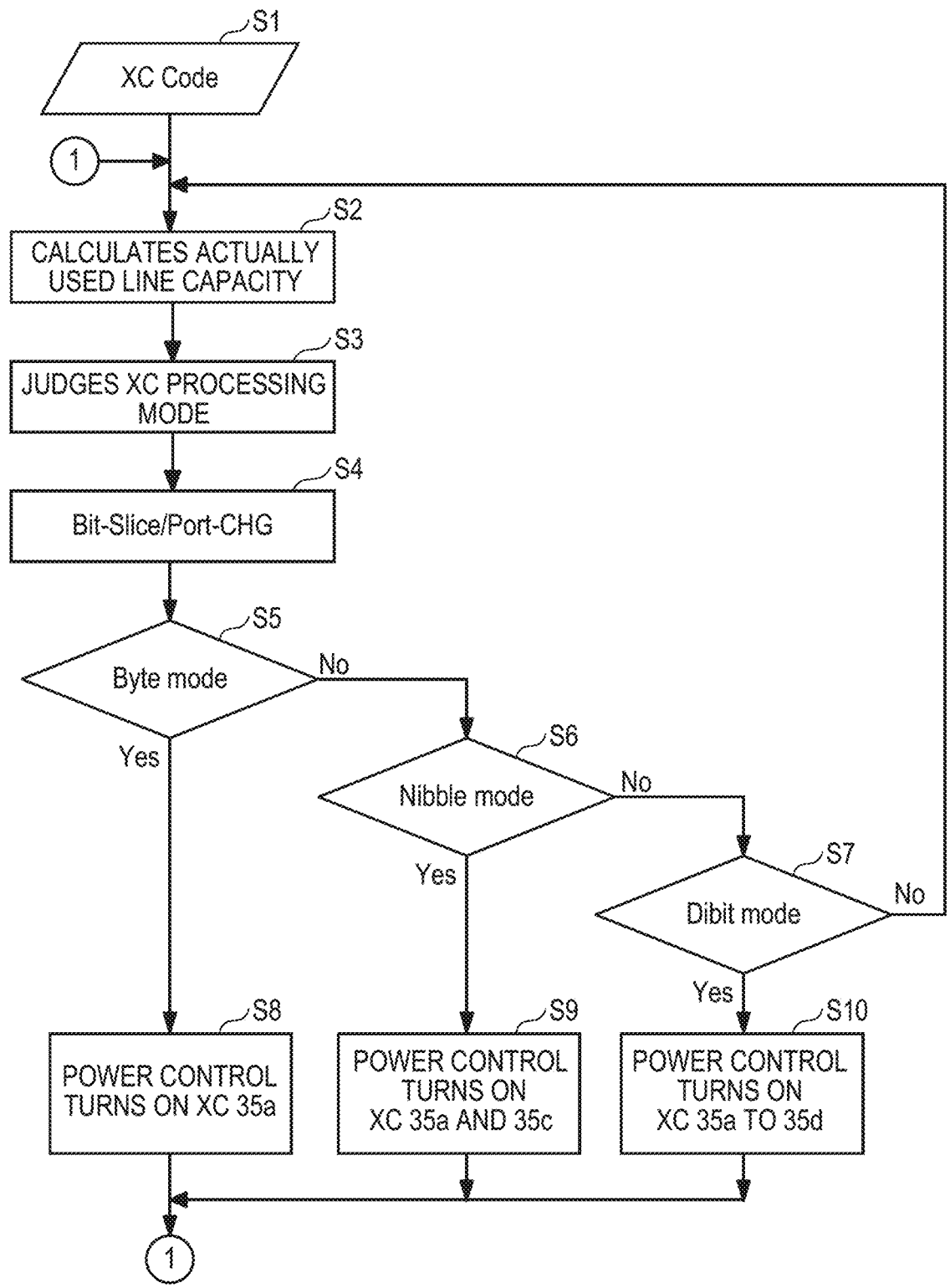
FIG. 13 is a flowchart of control processing.

FIG. 13 illustrates a flowchart of control processing executed by the controller 37. In the figure, at operation S1, line setting information is read from the line setting section 84, and, at operation S2, the actually used line capacity is calculated from the line setting information.

Then, at operation S3, a cross-connect processing mode is determined from the actually used line capacity. At operation S4, the bit-slice sections 54 and 63 and the port change sections 55 and 62 are controlled on the basis of the determined cross-connect processing mode.

Next, at operations S5, S6 and S7, it is judged whether the determined cross-connect processing mode is the byte mode, the nibble mode or the dibit mode. As a result, if the cross-connect processing mode is the byte mode, power control is performed so that the power supply for the cross-connect section 35a is turned on and the power supply for the cross-connect sections 35b, 35c and 35d is turned off, at operation S8.

If the cross-connect processing mode is the nibble mode, power control is performed so that the power supply for the cross-connect sections 35a and 35c is turned on and the power supply for the cross-connect sections 35b and 35d is turned off, at operation S9. If the cross-connect processing mode is the dibit mode, power control is performed so that the power supply for all the cross-connect sections 35a to 35d is turned on, at operation S10. Then, the flow proceeds to operation S2.

Figure 14:
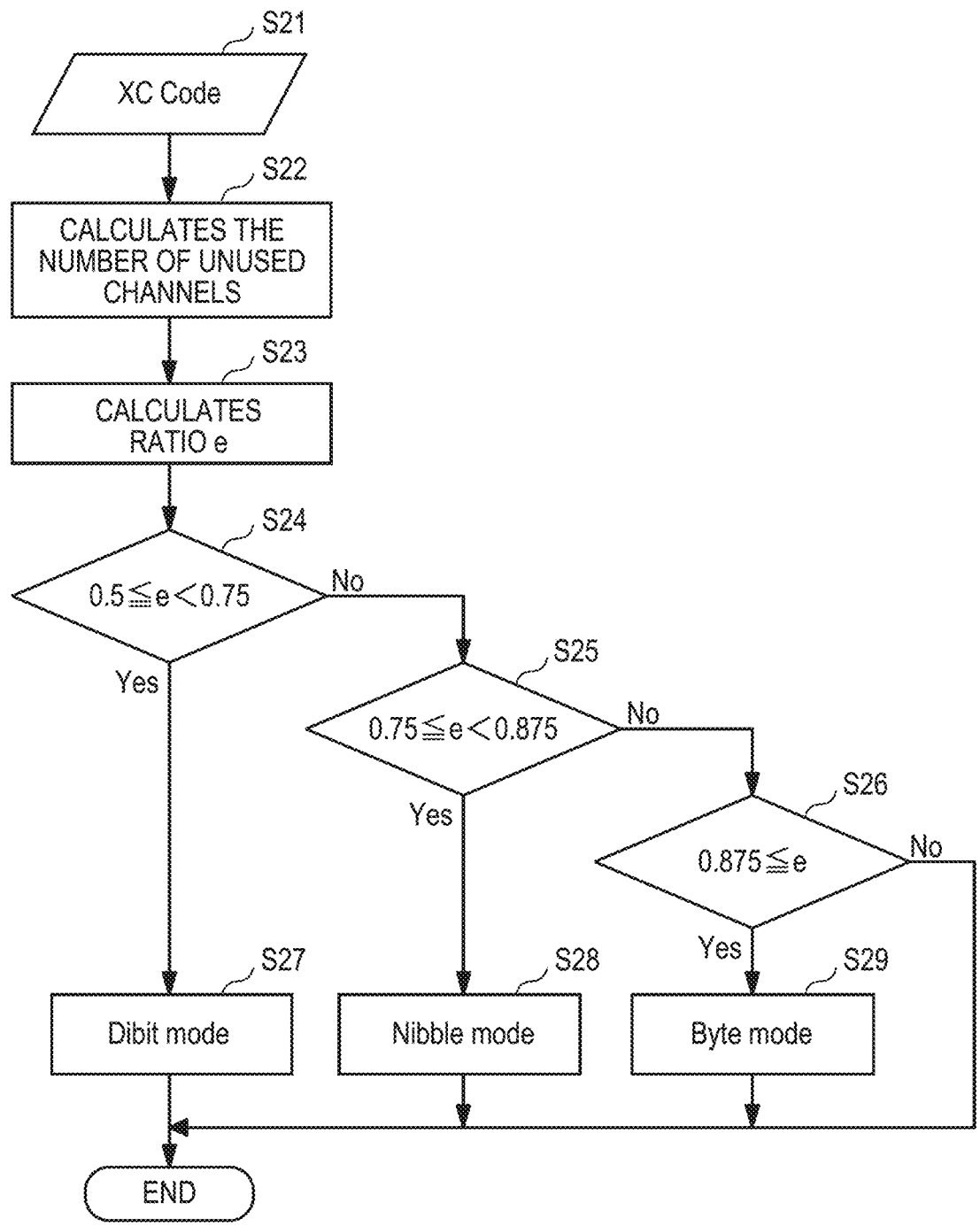
FIG. 14 is a flowchart of processing for determining a cross-connect processing mode.

FIG. 14 illustrates a flowchart of processing for determining the cross-connect processing mode of operation S3. In the figure, at operation S21, line setting information from the line setting section 84 is read, and, at operation S22, P, a number of unused channels which are not actually used is calculated from the line setting information. Then, at operation S23, the ratio e of the number of unused channels P to M, a maximum number of channels which can be (is enabled to be) cross-connected by the transmission apparatus (=P/M) is determined.

Next, at operations S24, S25 and S26, it is judged which of $0.5 \le e < 0.75$, $0.75 \le e < 0.875$ and $0.875 \le e$ is satisfied. As a result, if $0.5 \le e < 0.75$ is satisfied, the dibit mode is determined as the cross-connect processing mode at operation S27.

If $0.75 \le e < 0.875$ is satisfied, the nibble mode is determined as the cross-connect processing mode at operation S28. If $0.875 \le e$ is satisfied, the byte mode is determined as the cross-connect processing mode at operation S29. While specific range(s) are described herein, the present invention is not limited to these ranges or values.

In the switch card 33A which performs cross-connect processings for each channel, if the cross-connect processing is performed by two-chip division processing in the nibble mode, the bit-slice section 54 performs byte-nibble conversion for each channel, and the port change section 55 performs route switching for performing output to the cross-connect sections 35a and 35c. The same is true of the port change section 62 and the bit-slice section 63.

When the cross-connect processing mode is switched in an in-service state, a hit occurs in the operating line which accompanies bit phase fluctuation caused by the switching operations in the cross-connect processing, including the bit-slice sections 54 and 63 and the port change sections 55 and 62.

However, the secondary switch card 33B performs the same operation in synchronization with the timing, following the primary switch card 33A, and the output timings of the switch cards 33A and 33B agree with each other when seen from the interface cards 31-1 to 31-n. Therefore, when a redundancy switching operation is performed, switching without a hit (hitless switching) is possible.

Figure 15:
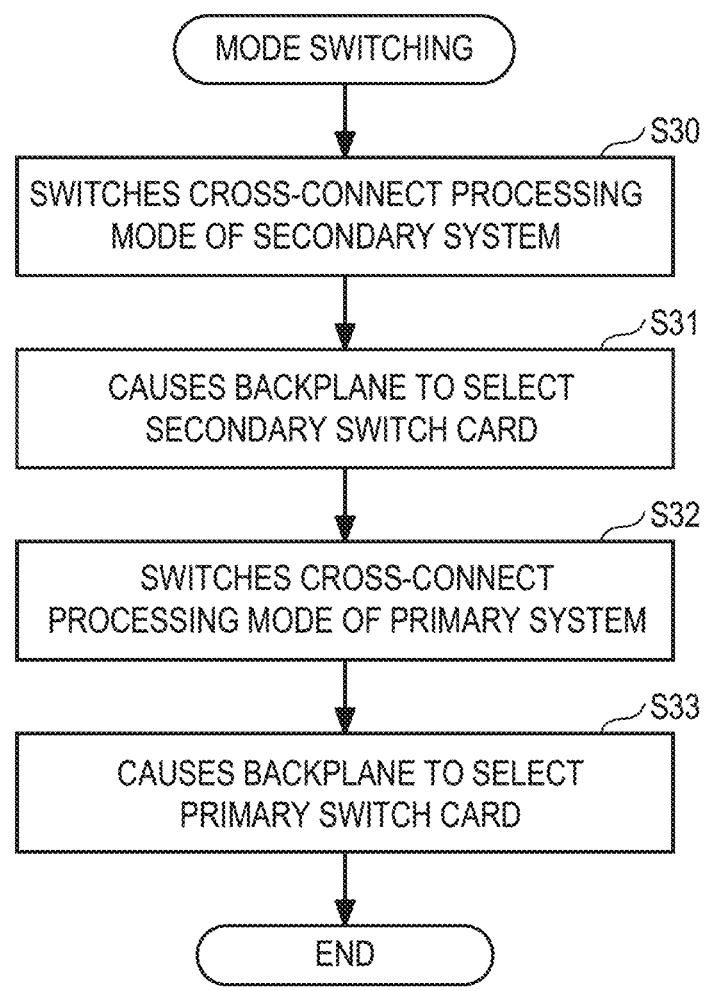
FIG. 15 is a diagram for illustrating switching of among cross-connect processing modes.

Therefore, the controller 37 of the primary switch card 33A switches the cross-connect processing mode as illustrated in FIG. 15.

In FIG. 15, at operation S30, the controller 37 of the secondary switch card 33B is instructed to switch the cross-connect processing mode of the secondary switch card 33B. At this time point, the backplane 32 outputs signals which have been cross-connect processed by the primary switch card 33A to the interface cards 31-1 to 31-n.

Next, at operation S31, the backplane 32 is instructed to select signals which have been cross-connect processed by the secondary switch card 33B.

Next, at operation S32, the cross-connect processing mode of the primary switch card 33A is switched.

Next, at operation S33, the backplane 32 is instructed to select signals which have been cross-connect processed by the primary switch card 33A. Thereby, hitless switching of the cross-connect processing mode can be realized.

According to the above embodiment(s), it is possible to reduce power consumption of an apparatus by performing control to switch to a cross-connect processing mode suitable for the actually used line capacity and, furthermore, stopping the power supply for devices which do not perform cross-connect processing. Furthermore, it is possible to perform control to dynamically switch to a configuration of hardware on a switch card suitable for the actual line setting state.

The embodiments can be implemented in computing hardware (computing apparatus) and/or software, such as (in a non-limiting example) any computer that can store, retrieve, process and/or output data and/or communicate with other computers. The results produced can be displayed on a display of the computing hardware. A program/software implementing the embodiments may be recorded on computer-readable media comprising computer-readable recording media. The program/software implementing the embodiments may also be transmitted over transmission communication media. Examples of the computer-readable recording media include a magnetic recording apparatus, an optical disk, a magneto-optical disk, and/or a semiconductor memory (for example, RAM, ROM, etc.). Examples of the magnetic recording apparatus include a hard disk device (HDD), a flexible disk (FD), and a magnetic tape (MT). Examples of the optical disk include a DVD (Digital Versatile Disc), a DVD-RAM, a CD-ROM (Compact Disc-Read Only Memory), and a CD-R (Recordable)/RW. An example of communication media includes a carrier-wave signal.

Further, according to an aspect of the embodiments, any combinations of the described features, functions and/or operations can be provided.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention.

Although the embodiment(s) of the present inventions has (have) been described in detail, it should be understood that the various changes, substitutions, and alterations could be made hereto without departing from the spirit and scope of the invention, the scope of which is defined in the claims and their equivalents.

What is claimed is:

1. A cross-connect apparatus, comprising:
an interface section which divides signals from a transmission line into multiple paths to provide the signals to cross-connect sections, and multiplexes signals from the cross-connect sections to send out the signals to the transmission line, the cross-connect sections cross-connecting the signals from the interface section to output the signals to the interface section; and
a control section which determines a number of paths divided by the interface section and an operation mode of the cross-connect sections, according to a line occupied by the signals from the transmission line relative to a maximum processing capacity, and
wherein each of the cross-connect sections is controlled based on comparison of a level of a corresponding use and the maximum processing capacity and an operation of a cross-connect section among the cross-connect sections which does not perform cross-connect processing is stopped based on a result of the comparison.

2. The cross-connect apparatus according to claim 1, wherein the interface section comprises:
a first bit-slice section which changes the number of divided paths according to the operation mode;
a first port change section which changes routes of the cross-connect sections for outputting the divided paths, according to the operation mode;
a second port change section which changes the routes of the cross-connect sections which input paths according to the operation mode; and
a second bit-slice section which changes the number of paths to be multiplexed according to the operation mode.

3. The cross-connect apparatus according to claim 2, comprising:
primary and secondary systems for each of the interface section, the multiple cross-connect sections and the control section; and
a central processing unit which synchronizes a primary control section and a secondary control section with each other and which, when changing the operation mode, changes an operation mode of the secondary control section, performs switching between the primary and secondary control sections and changes an operation mode of the primary control section.

4. The cross-connect apparatus according to claim 2, wherein
the control section cuts off a power supply for the cross-connect section which does not perform the cross-connect processing to stop an operation thereof.

5. The cross-connect apparatus according to claim 2, wherein
the control section causes the cross-connect section which does not perform the cross-connect processing to be into a low power consumption state to stop an operation thereof.

6. The cross-connect apparatus according to claim 2, wherein
the control section causes the cross-connect section which does not perform the cross-connect processing to be into a reset state to stop an operation thereof.

7. A cross-connect method, comprising:
dividing signals from a transmission line into multiple paths, for each channel, at an interface section and providing the signals to multiple cross-connect sections;
multiplexing the paths which have been cross-connect processed by the multiple cross-connect sections, at the interface section to return the paths to original channels and sending out the channels to the transmission line; and
wherein a number of paths divided by the interface section and an operation mode for specifying a cross-connect section which performs cross-connect processing are determined based on a line occupied by the signals from the transmission line relative to a maximum processing capacity, and
wherein each of the cross-connect sections is controlled based on comparison of a level of a corresponding use and the maximum processing capacity and an operation of a cross-connect section among the cross-connect sections which does not perform the cross-connect processing is stopped based on a result of the comparison.

8. The cross-connect method according to claim 7, wherein the number of divided paths is changed according to the operation mode;
routes of the cross-connect sections for outputting the divided paths are changed according to the operation mode;
the routes of the cross-connect sections which input the paths are changed according to the operation mode; and
the number of paths to be multiplexed is changed according to the operation mode.

9. The cross-connect method according to claim 8, wherein
each of the interface section, the multiple cross-connect sections and a control section is duplicated as primary and secondary systems;
the primary control section and the secondary control section are synchronized with each other; and
when the operation mode is changed, an operation mode of the secondary control section is changed, switching between the primary and secondary control sections is performed, and an operation mode of the primary control section is changed.

10. The cross-connect method according to claim 7, wherein
a power supply for the cross-connect section which does not perform the cross-connect processing is cut off to stop an operation thereof.

11. A cross-connecting method, comprising:
determining whether divided signals received from a transmission line into multiple paths require a current cross-connect processing mode relative to a maximum processing capacity, the signals being divided, for each channel, at an interface section; and
selectively adjusting the cross-connect processing mode when said determining indicates a level of an actual use outside the maximum processing capacity, where an operation of a cross-connect section is stopped when the actual use is determined to be outside the maximum processing capacity, where the paths are multiplexed at the interface section to return the paths to original channels and sending out the channels to the transmission line.

12. The cross-connecting method according to claim 11, wherein said adjusting includes dynamically switching a configuration of hardware on a switch card in accordance with said determining.

* * * * *